United States Patent

[11] 3,592,022

| [72] | Inventor | Raymond E. Stokely<br>Rockford, Ill. |
|---|---|---|
| [21] | Appl. No. | 885,229 |
| [22] | Filed | Dec. 15, 1969 |
| [45] | Patented | July 13, 1971 |
| [73] | Assignee | Borg-Warner Corporation<br>Chicago, Ill. |

[54] LUBRICANT SEAL
3 Claims, 4 Drawing Figs.

[52] U.S. Cl. .................................................. 64/17 A,
277/82, 277/94
[51] Int. Cl. ...................................................... F16d 3/41,
F16d 3/16
[50] Field of Search........................................... 64/17;
308/187.2, 187.1; 277/94, 95, 82

[56] References Cited
UNITED STATES PATENTS

| 3,266,269 | 8/1966 | Stokely | 67/17 A |
|---|---|---|---|
| 3,377,820 | 4/1968 | Smith | 27/82 X |
| 3,470,711 | 10/1969 | Kaysier | 64/17 A |
| 3,473,856 | 10/1969 | Helms | 277/94 X |
| 3,479,840 | 11/1969 | Meyers | 277/95 X |

*Primary Examiner*—Edward G. Favors
*Attorneys*—Donald W. Banner, William S. McCurry and John W. Butcher ABSTRACT: An elastically resilient lubricant seal includes a deformable shoulder portion for interference fitted engagement with a bearing cup and has a purging channel extending through part of the shoulder to define a purging lip. Elastically resilient sidewalls of the channel provide a bias for the lip which is independent of the fit between the seal and cup. A hinged shield portion is provided for protecting the lip from external contaminants.

INVENTOR
RAYMOND E. STOKELY

BY Herman E. Smith
ATTORNEY

3,592,022

LUBRICANT SEAL

SUMMARY OF THE INVENTION

The present invention relates generally to lubricant seals and more particularly to a lubricant seal for a universal joint.

A well-known form of universal joint comprises a pair of yokes journaled on a spider having four trunnion surfaces arranged in the form of a cross. A typical construction employs needle-bearing assemblies on each of the trunnion surfaces. In many applications of such universal joints, it is desirable to provide for lubrication of the bearing assemblies from a single grease fitting mounted on the spider and connected to the several bearing assemblies by means of internal passages. Typically, lubricant seals are employed with each of the bearing assemblies for retaining lubricant therein and for prohibiting the entrance of external contaminants such as grit, water and the like. Such seals are often constructed in such manner as to permit the purging of lubricant in order to assure that sufficient lubricant is present in the bearing assembly.

Where it is desired to lubricate a plurality of bearing assemblies from a common grease fitting, difficulty has been experienced in assuring that each of the bearing assemblies has, in fact, received a charge of lubricant. This difficulty is due, in part, to variations in manufacturing tolerances which result in tighter fits on some of the seals and looser fits on others. Where each of the bearing assemblies is in fluid communication with a common grease fitting, the lubricant tends to flow through the seal having the loosest fit with the bearing thereby denying lubricant to other bearing assemblies on the spider.

A further difficulty encountered in lubricating such bearing assemblies results, in part, from the range of lubrication pressures available in service facilities. The available pressure may be so low that lubricant is not forced through the bearing, or on the other hand, may be so high that the entire seal is blown out of the bearing assembly.

It is a principal object of the present invention to provide a lubricant seal which overcomes the above difficulties. Among the important features of the present seal is the provision of a purging channel defining a lip supported by elastically resilient sidewalls of the channel such that the lip permits purging of lubricant at a pressure determined by the sidewalls independently of the fit between the seal and bearing structure. A further feature of the present seal is the inclusion of a resiliently deformable ridge for holding seals securely in bearing assemblies having a range of dimensional tolerances. A still further feature of the present seal is the provision of resiliently deformable portions for engagement with portions of the bearing assembly forming valve means, more particularly pressure relief valve means and check valve means for permitting purging of lubricant at a preselected pressure and prohibiting the entry of external contaminants. These and other objects and advantages of the present invention will become more readily apparent through consideration of the following description and accompanying drawings.

DESCRIPTION OF THE PREFERRED EMBODIMENT

Figure 1:
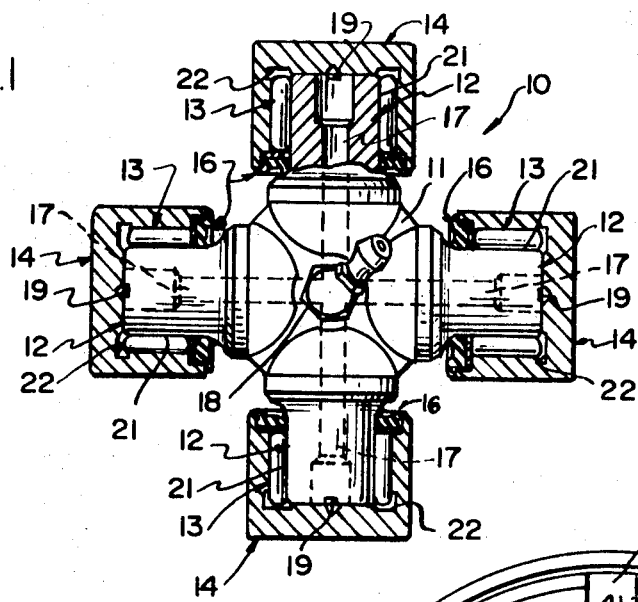
FIG. 1 is a view of a portion of a universal joint assembly employing seals according to the present invention.

Referring now in more detail to the drawings, the reference character 10 indicates a portion of a universal joint assembly including, a crossmember 11 having four trunnion portions 12 extending outwardly and spaced approximately 90° apart. Each of the trunnion portions 12 is received within a respective bearing assembly including needle-type roller bearings 13 and a bearing cup 14. The bearing cups 14 are adapted for assembly with yoke portions of a universal joint. Seals 16, to be described in more detail hereinafter, are provided for the bearing assemblies to permit purging of lubricant and prohibit the entry of contaminants.

Crossmember 11 includes internal lubrication passages 17 extending from the outer ends of the trunnion portions toward the center thereof joining each other for fluid communication with a common lubrication fitting 18. The outer ends of trunnion portions 12 are provided with slots 19 forming fluid passages from the passages 17 to the journal surfaces 21 of the trunnion portions.

Figure 4:
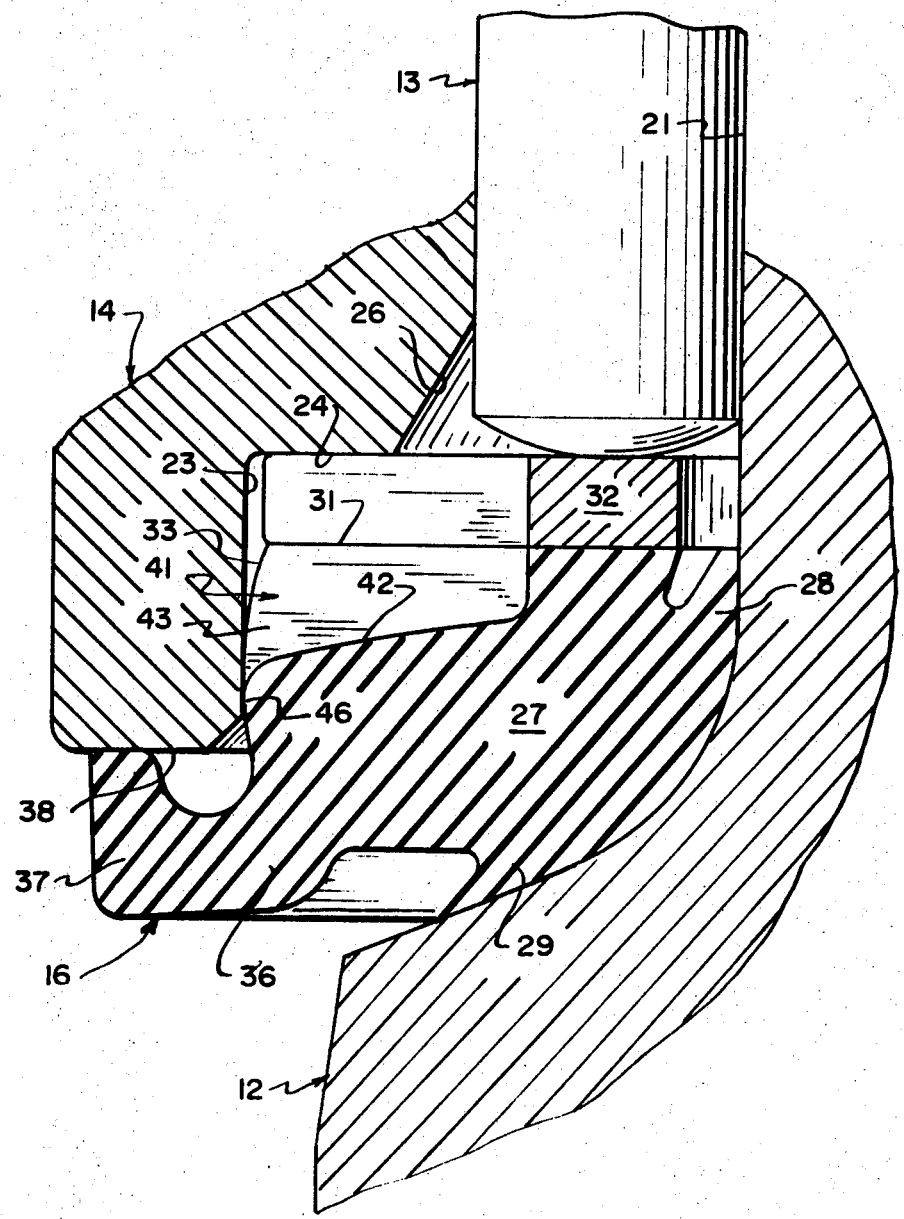
FIG. 4 is a fragmentary view, to enlarged scale, illustrating the cooperation of the present seal with portions of a universal joint bearing assembly.

Each of the bearing cups 14 is provided with an annular channel 22 in fluid communication with a respective journal surface 21 such that lubricant introduced into a passage 17 is permitted to flow radially through slot 19, then annularly around channel 22 in contact with the outer ends of a group of needle-bearing rollers 13. Lubricant is permitted to flow axially inwardly from the channel 22 between adjacent needle rollers 13 toward seal 16. As shown in FIG. 4, each bearing cup 14 is formed to provide an internal shoulder having an internal cylindrical surface 23 and a radial surface 24. The radial surface 24 joins a chamber 26 which provides a second annular channel extending around the inner ends of the group of needle rollers 13. The shoulder portion of cup 14 provides means for positioning seal 16 adjacent the second annular channel 26 such that lubricant forced between needle rollers 13 contacts the seal. Lubricant can then be purged through the seal 16 to expel entrapped air and spent lubricant.

Seal 16 includes an annular body 27 which is preferably formed of a rubberlike elastomeric material possessing properties of elastic resilience such that portions thereof may be readily deformed for engagement with portions of bearing cup 14 and trunnion 12. The body portion of seal 16 includes a pair of flexible sealing rings 28, 29 formed integrally with the body portion and which are deformable upon assembly with the trunnion to provide sealing means capable of retaining lubricant in the bearing assembly during relative rotation between the trunnion and bearing cup.

A radially disposed face 31 of body portion 27 is secured as by bonding to a relatively rigid backing ring 32 for imparting a measure of dimensional stability to a portion of the flexible body 27. A circumferential surface 33 disposed outwardly of backing ring 32 is provided by means of a deformable ridge portion 34 adapted for compressive static engagement with the internal cylindrical surface 23 of bearing cup 14. The diametral dimension of ridge 34 is selected to provide a secure interference fit with the cylindrical surface 23 of the bearing cup having regard for the expected manufacturing tolerances of the cup and the axial force to be exerted on the seal by the lubricant pressure.

Flexible body portion 27 is also provided with an integral annular hinge portion 36 merging with an integral annular shield portion 37 spaced axially from backing ring 32. Shield portion 37 is arranged to engage an outer radial face 38 of cup 14 forming a flexible one-way valve or check valve which is urged into engagement with face 38 by the inherent resilience of hinge portion 36 when the universal joint is stationary, and which receives an additional biasing force as a result of centrifugal force when the joint is rotating. Shield 37 thus provides check valve means for excluding contaminants from the bearing assembly, which becomes increasingly effective when the joint is in operation.

Figure 2:
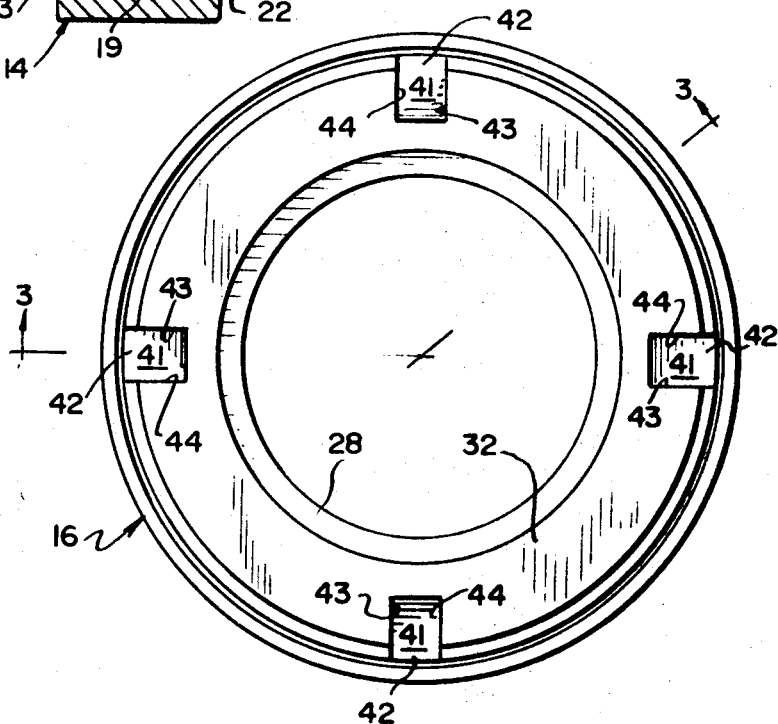
FIG. 2 is a plan view, to enlarged scale of a seal according to the present invention.
Figure 3:
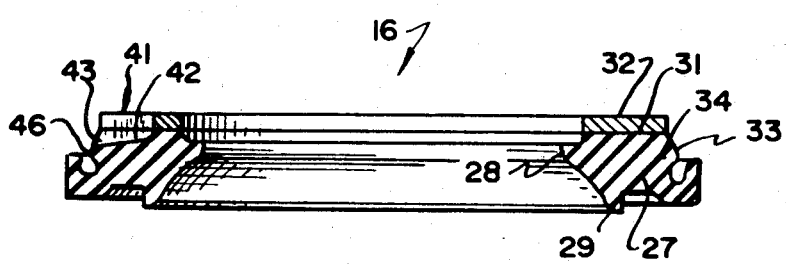
FIG. 3 is a section view taken along the lines 3—3 of FIG. 2.

Seal 16 is provided with at least one purging channel 41, and in the preferred embodiment as illustrated in FIG. 2, four such channels are employed. The number of channels and size of each may be varied to coincide with a value of lubricant pressure at which purging of the bearing is desired. EAch channel 41 is formed by a bottom wall 42 and a pair of sidewalls 43, 44 which extend through the ridge portion 34 to define a purging lip 46 in the circumferential surface 33 of elastic body member 27. Purging channel 41 also extends through the relative rigid backing ring 32 providing a means for fluid communication between the needle rollers 13 and purging lip 46.

As shown more clearly in the enlarged scale of FIG. 4, circumferential surface 33 and purging lip 46 undergo elastic deformation when the seal 16 is assembled in a bearing cup 14. Purging lip 46 is thus supported from the relatively rigid backing ring 32 by the yieldable resilient sidewalls 43, 44 of purging channel 41. As a result, lubricant pressure exerted on bottom wall 42 causes the sidewalls to stretch allowing lip 46 to move axially to permit the escape of lubricant. Lip 46 in cooperation with surface 23 of the bearing cup thus provides a flexible resilient relief valve means for controlling the purging lubricant through the bearing assembly. The resistance to movement of lip 46 is determined primarily by the resilient properties of sidewalls 43, 44 rather than by the compressive engagement of the seal surface 33 with the bearing cup surface 23. Thus, elastically resilient sidewalls 43, 44 provide means for preselecting a purging pressure which is independent of the fit between the seal and bearing cup.

Inasmuch as the purging pressure is determined primarily by the axial dimensions of the purging channel included within the body of the seal, it becomes possible to provide seals having substantially uniform response to a preselected purging pressure independently of the bearing assemblies with which the seals are employed. Since the purging pressure is independent of the fit between the seal and bearing cup, the seal may be constructed to provide a tight fit with the bearing cup for resisting the sudden application of high-pressure lubricant, while retaining the capability of relieving pressure at the predetermined purging pressure. Thus a universal joint employing seals according to the present invention may be lubricated at high pressure without blowing the seal out the bearing cup, and may be lubricated at low pressure with assurance that lubricant reaches each of the bearing assemblies even though the several bearing assemblies are connected to a common lubrication fitting.

Seals constructed in accordance with the foregoing description provide a flexible pressure relief valve means in series with a flexible check valve means permitting purging of the bearings at a preselected pressure using either high or low lubrication pressure while assuring uniform lubrication of several bearings connected to a common lubricant source and in addition, prohibiting the back flow of external contaminants.

What I claim is:

1. A lubricant seal adapted to control purging of lubricant from a bearing of a universal joint, said bearing including a bearing cup having an internal cylindrical surface adapted to receive said seal; said seal including an annular body of elastically resilient deformable elastomeric material having a face thereof secured to a relatively rigid backing ring, said body including inner flexible sealing means adapted for wiping engagement with a trunnion portion of said universal joint and including an outer circumferential surface adapted for compressive static engagement with said bearing cup internal cylindrical surface; and said seal including a purging channel extending through said backing ring and a portion of said body, said channel being defined in part by a pair of spaced elastic sidewalls extending from a bottom wall, said bottom wall and sidewalls intersecting said outer cylindrical surface defining a purging lip therein spaced axially from and supported by said backing ring, said purging lip being resiliently biased by means of said elastic sidewalls for limited axial movement toward and from said backing ring.

2. A lubricant seal according to claim 1 in which said outer circumferential surface includes a deformable ridge adapted for compressive static engagement with said bearing cup internal cylindrical surface, said channel bottom and sidewalls intersecting said ridge for defining said purging lip.

3. A lubricant seal according to claim 1 in which said annular body further includes an integral annular resilient hinge portion spaced axially from said outer circumferential surface supporting an integral annular shield portion disposed radially outwardly of said purging lip for limited axial displacement toward and from said backing ring.

UNITED STATES PATENT OFFICE
CERTIFICATE OF CORRECTION

Patent No. 3,592,022      Dated July 13, 1971

Inventor(s) RAYMOND E. STOKELY

It is certified that error appears in the above-identified patent and that said Letters Patent are hereby corrected as shown below:

In Column 4, line 23 of the printed patent,

"said outer cylindrical surface:

should read:

"said outer circumferential surface"

Signed and sealed this 28th day of November 1972.

(SEAL)
Attest:

EDWARD M. FLETCHER, JR.
Attesting Officer

ROBERT GOTTSCHALK
Commissioner of Patents